W. P. REIBOLDT & F. W. BEYEN.
ACOUSTIC SIGNAL DEVICE.
APPLICATION FILED JULY 23, 1914.
1,230,602.
Patented June 19, 1917.
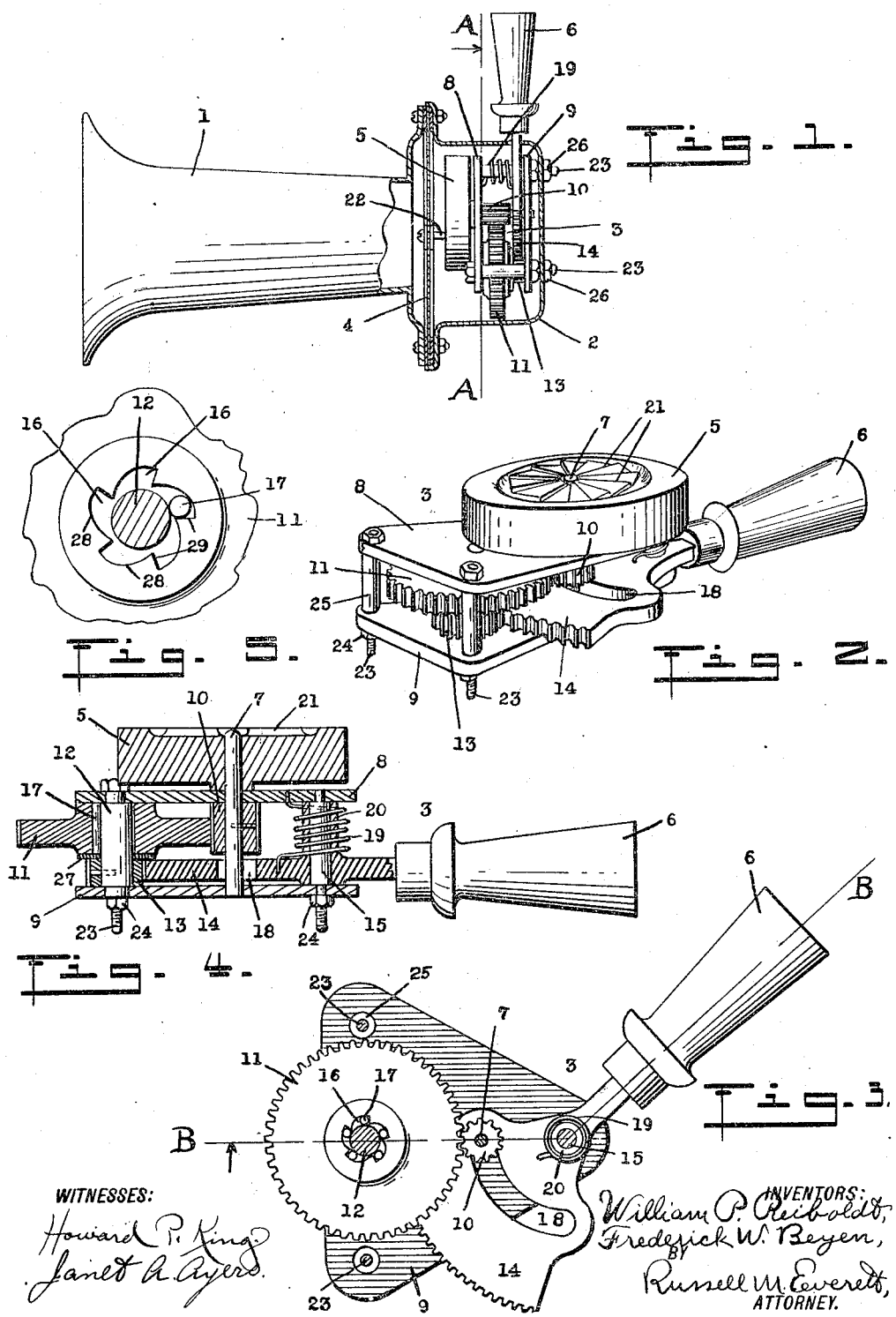

UNITED STATES PATENT OFFICE.

WILLIAM P. REIBOLDT, OF IRVINGTON, AND FREDERICK WM. BEYEN, OF NEWARK, NEW JERSEY, ASSIGNORS TO R. H. B. MANUFACTURING COMPANY, A CORPORATION OF NEW JERSEY.

ACOUSTIC SIGNAL DEVICE.

1,230,602.  Specification of Letters Patent.  Patented June 19, 1917.

Application filed July 23, 1914. Serial No. 852,566.

*To all whom it may concern:*

Be it known that we, WILLIAM P. REIBOLDT and FREDERICK WILLIAM BEYEN, a citizen of the United States and a subject of the Emperor of Germany, respectively, and residents of Irvington and Newark, respectively, in the county of Essex and State of New Jersey, have invented certain Improvements in Acoustic Signal Devices, of which the following is a specification.

The objects of this invention are to provide an improved signal device; to provide a structure adapted to produce a high velocity of vibration of the diaphragm; to provide a clutch for connecting the diaphragm vibrating means to the operator's actuating means so as to obtain a positive connection between said parts when the actuating means is operated in one direction and to provide a roller bearing when the actuating means is stopped or operated in the other direction; to economize space; to provide means for stopping the operation of the device; to stop the device by manipulating the same handle with which the device is caused to operate; to secure simplicity of construction and operation, and to obtain other advantages and results as may be brought out in the following description.

Referring to the accompanying drawings, in which like numerals of reference indicate the same parts throughout the several views, Figure 1 is a side elevation of a signal device with parts broken away to better disclose the invention;

Fig. 2 is a perspective view of the diaphragm actuating means removed from the casing;

Fig. 3 is a sectional view of the same taken on line A—A of Fig. 1;

Fig. 4 is a sectional view on line B—B of Fig. 3, and Fig. 5 is a detail view of the clutch.

In the specific embodiment of the invention illustrated in said drawings, the reference numeral 1 indicates an amplifying horn to the smaller end of which is attached a casing 2 for containing the mechanism 3 for vibrating a diaphragm 4 clamped at its periphery between the horn and casing.

Said vibrating mechanism comprises a rotary fly wheel 5 providing a comparatively large moment of inertia, and adapted to be rotated through a suitable train of gearing by swinging a handle 6 which extends radially through the casing 2 convenient to be manipulated by the operator. The fly wheel 5 is preferably non-rotatably secured to a shaft 7 which is journaled in a pair of separated side plates 8, 9 transversely thereof, the fly wheel being upon the outside of one side plate, as 8. Between the side plates, adjacent the plate 8 upon the opposite side of which the fly wheel is mounted, is a small gear 10 also non-rotatably secured to the shaft 7, engagement of the fly wheel and gear upon opposite sides of the side plate preventing longitudinal movement of the shaft. In mesh with this small gear 10 is a large gear 11 mounted upon a rotatable member or spindle 12 which is journaled at its ends in the side plates. Upon this same rotatable member between the large gear 11 and the side plate 9 away from the fly wheel is a pinion 13 in mesh with a segmental gear 14 pivoted as at 15 and provided with the handle 6 above mentioned. Swinging said handle thereby rotates the pinion 13, spindle 12 and large gear 11, which causes the small gear 10 and fly wheel 5 to rotate at a high rate of speed.

It is desirable to have the fly wheel continue to rotate under the influence of its own inertia when the handle is stopped or retracted, and for this purpose we include an automatic clutch between two of the parts, for instance, as shown in the drawings, this clutch is arranged to operate between the large gear 11 and the spindle 12, the pinion 13 consequently being made fast upon the spindle and the small gear 10 being secured to the shaft 7. It is to be understood, however, that we do not restrict ourselves to use of this clutch in this particular position, the same being shown thereat for illustrative purposes only. At the center of the gear 11 around the spindle 12 are a plurality of recesses or pockets 16 having outer walls inclined toward the spindle, each of said pockets extending from end to end of the gear and containing a roller 17. Furthermore, the pockets and rollers are so proportioned that said rollers are always in contact with the spindle and support the gear 11 thereon. Also the pockets are shaped so as to allow each roller to turn freely when seating toward one end of its slot, so as to form roller bearing for the gear; whereas when seating toward the other end the roller will wedge between the inclined wall of the pocket and the spindle, thereby frictionally connecting the spindle and gear to turn as a unit. It is to be especially noted that no portion of the gear engages the spindle, so that the rollers are always in positive contact with the gear and spindle so as to frictionally connect the same or reduce the frictional resistance to rotation automatically as desired. Obviously only a very slight relative movement in the proper direction between the gear 11 and the spindle 12 is necessary to cause the rollers to wedge therebetween, thus obtaining movement of the fly wheel 5 by the slightest movement of the handle 6, so that the fly wheel may be not only instantly started but given a very rapid rate of rotation by swinging the handle 6 rapidly back and forth, alternately impelling the fly wheel forward with movement of the handle in one direction and allowing it to spin idly with movement of the handle in the other direction.

Preferably the pivot 15 for the segmental gear 14 is upon the opposite side of the shaft 7 from the spindle 12, said shaft projecting freely through an appropriate arcuate slot 18 in the segmental gear, the ends of said slot limiting the amplitude of swing of said gear by engagement with the shaft. Furthermore, we obtain by this construction a means for readily stopping the rotation of the fly wheel when desired by pressing upon the handle 6 to engage the end of the slot 18 against the shaft, it being obvious that the operator uses the same handle for operating and stopping the device. It is desirable to cause the handle to return of its own accord to initial position after having been swung, so as to be ready to actuate the fly wheel again when desired, and for this purpose we provide a torsional spring 19 surrounding the post 20 through which the pivot 15 extends, one end of said spring being attached to the segmental gear and the other end to the side plate 8.

The means here shown for causing the diaphragm 4 to vibrate from the rotating fly wheel 5 consists of a plurality of projections 21, here shown as a circular series of wedge-shaped projections integral with the fly wheel upon its face toward the diaphragm. The diaphragm has at its center a contact member or wear piece 22 which is moved back and forth rapidly by the passage of the projections 21 in successive engagement against the end of said member.

In operation, the device is caused to sound by swinging the handle, thereby rotating the fly wheel which continues to rotate by virtue of the momentum which it attains, until its energy is exhausted. For a prolonged signal the handle is worked back and forth, movement of the same in the initial direction supplying additional energy to the fly wheel, the movement of the handle in the other direction merely causing the rollers 17 to rotate within the deep portions of their pockets, and so on. Obviously the rate at which the fly wheel is turning may be increased by swinging the handle back and forth very rapidly, the pitch of the tone produced being raised as the fly wheel gains speed because of the greater frequency of displacement of the diaphragm caused by the projections 21 engaging the contact member 22 more often. When the operator has caused the fly wheel to rotate and the signal to sound as desired, he merely need let go of the handle and the same will return to initial or retracted position under the influence of the spring 19, and if desired this spring may be of sufficient strength to press the end of the slot 18 against the rotating shaft 12 with sufficient force to quickly stop the fly wheel from rotating. Preferably, however, we do not employ a spring having torsional strength sufficient for this purpose, as it is often desirable to allow the signal to continue to operate as long as it will without attention from the operator. But where it is desired to cause the rotating to cease, it will be obvious that the operator only need press the handle so the end of the slot engages the spindle as described.

The construction which we have employed of arranging the gears between the two opposite side plates 8 and 9 conduces not only to cheapness and compactness but provides a very firm and rigid connection of the various parts, such as holds them in their proper relative position to operate easily and effectively. The plates 8 and 9 are preferably connected by means of short rods 23 threaded at their opposite ends to receive nuts 24 outside the plates 8 and 9, sleeves 25 being slipped on said rods between the plates to hold them apart. The gears are thus very readily assembled between said plates 8 and 9, and then the whole is quickly assembled in the casing 2 by extending the adjacent ends of the rods 23 through said casing, and applying nuts 26 thereto outside the casing, as shown in Fig. 1.

A washer 27 may be placed on the spindle 12 between the large gear 11 and pinion 13.

Preferably the sloping or inclined walls 28 of the pockets or recesses 16 are slightly curved outward, as shown, but they could obviously be otherwise if desired. Furthermore, the end walls 29 of said recesses, at their deep ends, are preferably plane and radially disposed, as shown, so that there is no overhang to create any tendency to hold the rollers away from the shaft 7.

Obviously detail modifications may be made in manufacturing our improved signal device without departing from the spirit and scope of the invention, and we do not wish to be understood as limiting ourselves except as required by the following claims when construed in the light of the prior art.

Having thus described the invention, what we claim is.

1. The combination with a diaphragm and a rotary member for causing said diaphragm to vibrate, of a member having a limited range of movement adapted when moved in one direction to rotate said rotary member and to be retracted in the other direction independent of the said member, said member when pressed toward the end of its range of movement frictionally engaging the said rotary member to stop its rotation, and means for transmitting motion between said last-mentioned member and the rotary member.

2. The combination with a diaphragm, a rotary shaft and a member on said shaft for causing said diaphragm to vibrate, of a segmental gear slotted to receive said shaft and adapted to engage the same as a brake, and means for transmitting to said shaft motion of said segmental gear in one direction and allowing it to turn independent thereof when moved in the other direction.

3. The combination with a diaphragm, a rotary shaft and a member on said shaft for causing said diaphragm to vibrate, of a segmental gear having a closed slot receiving said shaft and adapted to engage the same at its ends, means for transmitting to said shaft motion of said segmental gear in one direction and allowing it to turn independent thereof when moved in the other direction, and a spring for moving said segmental gear in said other direction.

4. The combination with a diaphragm, a rotary shaft and a member on said shaft for causing said diaphragm to vibrate, of a movable member adapted to clear said shaft for a portion of its movement and to engage the same upon further movement, and means associated with said movable member for transmitting to said shaft motion when said member is moving in one direction and allowing it to turn independent of said member when moving in the other direction.

5. The combination with a diaphragm, a rotary shaft and a member on said shaft for causing said diaphragm to vibrate, of a movable member having a back and forth movement, and means associated with said movable member for transmitting to said shaft motion when said member is moving in one direction and allowing said shaft to turn independent of said member when moving in the other direction, said member adapted to engage the shaft at the end of its movement in said other direction.

WILLIAM P. REIBOLDT.
FREDERICK WM. BEYEN.

Witnesses:
HOWARD P. KING,
JANET A. AYERS.

Copies of this patent may be obtained for five cents each, by addressing the "Commissioner of Patents, Washington, D. C."